(12) United States Patent
Michalski et al.

(10) Patent No.: US 7,379,449 B2
(45) Date of Patent: May 27, 2008

(54) METHOD AND SYSTEM OF SUPPORTING ABBREVIATED DIALING BETWEEN AFFILIATED PHONES WHEREIN AT LEAST ONE PHONE IS ASSOCIATED WITH A NON-AFFILIATED NETWORK

(75) Inventors: Robert Michalski, Algonquin, IL (US); Wayne Heinmiller, Elgin, IL (US); Dianna Tiliks, Palatine, IL (US); Carol Gruchala, Naperville, IL (US); Louis M. Morales, Whittier, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 488 days.

(21) Appl. No.: 11/128,820

(22) Filed: May 13, 2005

(65) Prior Publication Data

US 2006/0256946 A1    Nov. 16, 2006

(51) Int. Cl.
*H04L 12/66* (2006.01)

(52) U.S. Cl. ..................................... 370/352; 370/401

(58) Field of Classification Search ................ 379/156, 379/90.01, 111, 142.02, 133, 221.03, 216; 370/352–356, 395.5, 401, 427
See application file for complete search history.

(56) References Cited

U.S. PATENT DOCUMENTS

| | | | |
|---|---|---|---|
| 5,881,145 | A | 3/1999 | Giuhat et al. |
| 6,718,030 | B1 | 4/2004 | Turner et al. |
| 6,865,266 | B1 | 3/2005 | Pershan |
| 2002/0075847 | A1* | 6/2002 | Gunn et al. ................. 370/352 |
| 2002/0176404 | A1 | 11/2002 | Girard |
| 2003/0231759 | A1* | 12/2003 | Bedingfield et al. ... 379/355.01 |
| 2005/0025128 | A1 | 2/2005 | Chiu |

* cited by examiner

*Primary Examiner*—Suhan Ni
(74) *Attorney, Agent, or Firm*—Brooks Kushman P.C.

(57) ABSTRACT

Method and system of supporting abbreviated dialing. The method and system may be used in conjunction with calls between affiliated phones if at least a portion of the signals associated therewith are transmitted over a non-affiliated network.

14 Claims, 1 Drawing Sheet

METHOD AND SYSTEM OF SUPPORTING ABBREVIATED DIALING BETWEEN AFFILIATED PHONES WHEREIN AT LEAST ONE PHONE IS ASSOCIATED WITH A NON-AFFILIATED NETWORK

BACKGROUND OF THE INVENTION

1. Field of the Invention

The present invention relates to methods and systems of supporting abbreviated dialing between affiliated phones wherein at least one of the phones is associated with a non-affiliated network.

2. Background Art

With the availability of new technology, customers may be looking for ways to migrate some of their Centrex lines over to VoIP platforms. One problem which arises as phones are moved over to VoIP platforms is the loss of Centrex services between the migrated and non-migrated phones. Accordingly, a need exists to allow Centrex customers who have moved some of their lines over to the VoIP platform to retain Centrex functionality on those lines, such as to support abbreviated dialing between the lines.

DETAILED DESCRIPTION OF THE PREFERRED EMBODIMENT(S)

Figure 1:
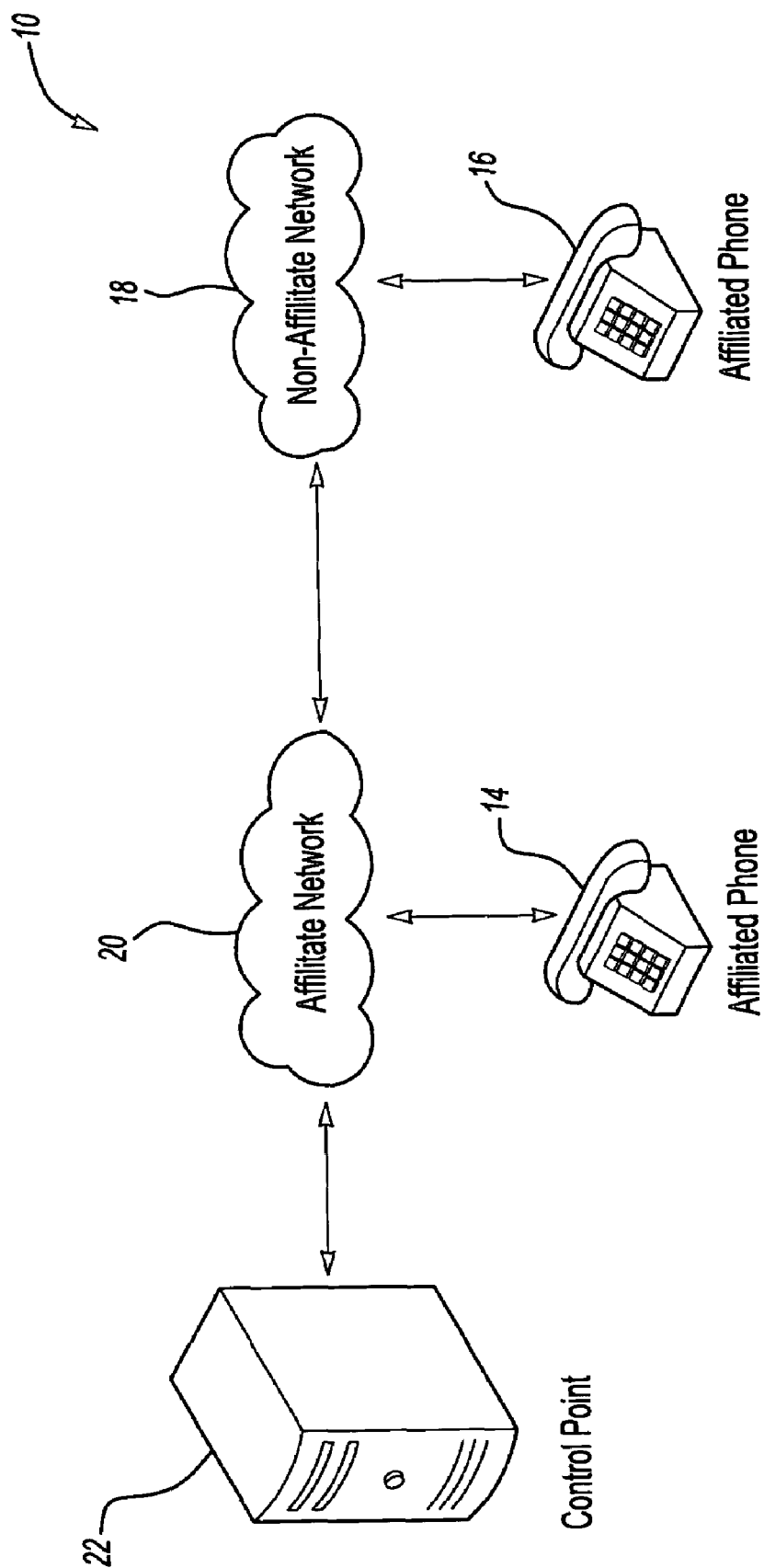
FIG. 1 illustrates a system of supporting phone services between affiliated phones in accordance with one non-limiting aspect of the present invention.

One non-limiting aspect of the present invention relates to a method of supporting abbreviated dialing between affiliated phones in an environment where at least one of the phones is associated with a non-affiliated network. The method may include determining dialing of an abbreviated number from an affiliated phone and determining a routing number as a function of the abbreviated number. The abbreviated number may be associated with an affiliated phone of the non-affiliated network. The routing number may be associated with the non-affiliated network and sufficient to support routing of a phone call between the affiliated phones.

The method may include billing the phone call as if the phone call was routed between affiliated networks and not between non-affiliated networks.

The method may include determining the phone call to be between affiliated phones prior to determining the routing number, such as if the phones are associated with a common Centrex system.

The method may include determining the phone call to be between non-affiliated networks prior to determining the routing number, such as if the phones are connected to different Centrex systems; if the phones are connected to networks provided by different service providers, or if one of the phones is connected to a TDM network and the other phone is connected to or reached through an IP network.

The method may include determining the routing number to support routing the phone call through an IP based network so as to support IP based phone calls, and optionally, packetizing signals associated with the phone call from non-IP based signals to support IP based phone calls.

The method may include routing the phone call between the affiliated phones as a function of the routing number.

Another non-limiting aspect of the present invention relates to a system of supporting abbreviated dialing. The system may include at least two affiliated phones and a control point configured for determining dialing of an abbreviated number. At least one of the phones may be associated with a non-affiliated network and the abbreviated number may be associated with a phone call between the phones such that the control point may be configured for determining a routing number as a function of the abbreviated number to support routing of a phone call between the phones.

The control point may be configured for determining billing for the phone call as if the phone call was routed between affiliated networks and not between non-affiliated networks.

The control point may be configured for determining the phone call to be between affiliated phones prior to determining the routing number if the phones are associated with a common Centrex system, such as if the phones are connected to different Centrex systems, if the phones are connected to networks provided by different service providers, or if one of the phones is connected to a TDM network and the other phone is connected to or reached through an IP network.

The control point may be configured for determining the routing number to support routing the phone call through an IP based network so as to support IP based phone calls.

The control point may be configured for packetizing signals associated with the phone call from non-IP based signals to signals to IP based affiliated phone so as to support IP based phone calls. The control point may be configured for generating the non-IP based signals from a TDM based phone and receiving the IP based signals with a VoIP based phone.

The control point may be configured for routing the phone call between the affiliated phones as a function of the routing number.

The above features and advantages, along with other features and advantages of the present invention, are readily apparent from the following detailed description of the invention when taken in connection with the accompanying drawings.

FIG. 1 illustrates a system 10 of supporting phone services between affiliated phones 14 and 16 in accordance with one non-limiting aspect of the present invention. The system 10 generally relates to an environment wherein phone calls between affiliated phones 14 and 16 must be completed between an affiliated network 20 and at least one non-affiliated network 18, i.e. networks 18 and 20 may be provided by different service providers and/or associated with different operating systems.

The networks 18 and 20 may be wireline and/or wireless networks, or some combination thereof. For example, the present invention contemplates supporting calls communicated through terrestrial or extraterrestrial wireless configurations and through the inclusion of any number of other features, such as with soft switches, signal transfer points (STPs), signal service points (SSPs), service nodes (SNs), service package applications (SPAs), wireless cells, mobile switching centers (MSCs), home location registers (HLRs), visitor location registers (VLRs), server offices, server switches, feature servers, application program interfaces (APIs), and the like.

The networks 18 and 20, for the purposes of the present invention, may be considered as non-affiliated networks if they are supported by different services providers. Likewise, the networks 18 and 20 may be considered as non-affiliated networks, even if the networks are supported by the same service provider, if they are associated with different operation systems, such as if one network is a time or frequency division multiplexed (TDM, FDM) network and the other is an Internet Protocol (IP) or other packet switching based network, and/or if one network is associated with a Centrex system and the other is associated with a different Centrex system or none at all.

The affiliations may be determined as a function of service providers, system configuration, and other dichotomies which distinguish between the networks. For example, the networks 18 and 20 may be considered as non-affiliated networks if charges, fees, or other costs are typically incurred or associated with routing calls through the non-affiliated network. Accordingly, the present invention fully contemplates any number of configurations and means for determining whether the networks 18 and 20 are affiliated or non-affiliated.

The system 10 further requires the phones 14 and 16 to be affiliated, i.e. with each other and at least one of the networks 18 and 20. The affiliation of the phones 14 and 16 may be determined in a manner similar to the affiliation of the networks 18 and 20. For example, the phones 14 and 16 may be affiliated if they are associated with a common Centrex system, a common service provider, and/or a common account. Unlike the networks 18 and 20, however, the phones 14 and 16 may be affiliated if they have different operating characteristics or parameters, such as if one of the phones is a TDM or FDM phone and the other phone is an IP phone.

A control point 22 may be associated with the affiliated network 20 and phones 14 and 16 and configured to support the operation thereof. For example, the control point 22 may be central office (CO), service control point (SCP), integrated service control point (ISCP), or any other device or system configured to support call routing between the phones 14 and 16. In particular, the control point 22 may be configured to support Centrex and other similar call management operations. The phones may be located at remote locations and the control point may be configured to provide Centrex based services between the remotely located phones. For example, the phones 14 and 16 may be associated with a Centrex customer having remotely located offices.

The Centrex operations may be distinct from typical phone services, as one having ordinary skill in the art will appreciate. The Centrex services may include any number of services or custom services, including intercom communicating, call forwarding, call transferring, toll restricting, least cost routing, call holding, abbreviated dialing, and the like. The Centrex operations and services described by the present invention are intended to relate to any number of operations and services and the systems, applications, or features required to support them. Of course, the present invention fully contemplates any number of other services and is not intended to be limited to the foregoing.

The system 10 may include any number of features, exchanges, switches, networks and other parameters to facilitate servicing calls between the phones. Of course, the present invention fully contemplates any number of components and is not intended to be limited to the foregoing. Rather, the foregoing is intended to represent one of a number of configurations suitable for supporting operations in accordance with the present invention.

The control point 22 may be configured to determine a routing number to facilitate routing a phone call associated therewith. In more detail, a user may dial an abbreviated number associated with the second phone into the first phone, such as if the phones 14 and 16 are associated with a common Centrex system that supports abbreviated dialing. The control point 22 may include a lookup table, database, or other feature configured to determine the routing number as a function of the abbreviated number. The routing number may be one or more numbers associated with supporting routing of the phone call through the non-affiliated network 18.

For example, the non-affiliated network 18 may be associated with an IP network. The control point 22 may be configured to determine a routing number or other addressing sufficient for relaying the call through soft-switches and other IP based devices associated with the non-affiliated network 18. The control point 22 may initiate a local number portability (LNP) inquiry to determine a local routing number (LRN) associated with completing a call. The LRN may include any number of digits and configurations, which for the exemplary purposes may correspond with a ten-digit number comprising an area code, city code, and destinations code, associated with the dialed extension, such as 847-727-2019. The LRN may correspond with number plan areas (NPAs), such as the North American number plan area (NPA-NXX), or any number of other number plan areas, such as those associated with international dialing.

Of course, the present invention contemplates the control point 22 being configured to determine any number of routing numbers and to support any number of operations associated with completing the call through the non-affiliated network. For example, if the dialing phone is TDM based and the dialed phone is IP based, the control point may be configured to packetize the signals associated therewith and to provide sufficient addressing so as to facilitate transporting the signals over a non-affiliated IP network for receipt by the IP based phone. In this manner, the present invention is able to support abbreviated dialing between affiliated phones of non-affiliated networks, i.e., between a TDM and IP network.

The control point 22 may be configured to bill calls routed between the phones as if the calls were made over an affiliated network or through a common Centrex system. For example, if the phones 14 and 16 are associated with a Centrex system, calls between the phones may be billed according to billing parameters associated with the Centrex system, even if the signaling outside of the Centrex system is performed. This may be advantageous in supporting customers having a Centrex system with some phones being supported over TDM networks and some phones being supported over IP networks, which is a common problem when customers migrate from TDM phones to IP phones.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of supporting abbreviated dialing between phones, the method comprising:

determining dialing by a first phone of an abbreviated number associated with a second phone, wherein the phones are affiliated with one another by being associated with a customer of a service provider, wherein the first phone is in a circuit-switched network associated with a Centrex system of the service provider and the second phone is in an Internet Protocol (IP) packet-switched network disassociated from the Centrex system, wherein affiliated phones in the circuit-switched network are associated with the Centrex system, wherein the Centrex system supports abbreviated dialing between phones associated with the Centrex system; and determining a routing number for a phone call from the first phone to the second phone as a function of the abbreviated number, the routing number including IP addressing sufficient to support routing of the phone call through the packet-switched network to the second phone such as if both phones were associated with the Centrex system.

2. The method of claim 1 further comprising:
billing the phone call as if the phone call was routed between the same network and not between different networks.

3. The method of claim 1 further comprising:
determining the phone call to be between affiliated phones prior to determining the routing number.

4. The method of claim 1 further comprising:
determining the phone call to be between different networks prior to determining the routing number.

5. The method of claim 1 wherein:
the circuit-switched network is a TDM network.

6. The method of claim 1 further comprising:
packetizing signals associated with the phone call from non-IP based signals to support IP based phone calls.

7. The method of claim 1 wherein:
the packet-switched network is a VoIP network.

8. The method of claim 1 further comprising:
routing the phone call between the phones as a function of the routing number.

9. A system of supporting abbreviated dialing between phone lines, the system comprising:

a plurality of phone lines, wherein the phone lines are affiliated with one another by being associated with a customer of a service provider, wherein a first one of the phone lines is in a circuit-switched network and a second one of the phone lines is in an Internet Protocol (IP) packet-switched network; and a control point of the service provider, wherein the control point includes a Centrex system which supports abbreviated dialing between phone lines associated with the Centrex system, wherein affiliated phone lines in the circuit-switched network are associated with the Centrex system and affiliated phone lines in the packet-switched network are disassociated from the Centrex system;

wherein the control point is configured for determining dialing from the first phone line of an abbreviated number associated with the second phone line, wherein the control point is further configured for determining a routing number for a phone call from the first phone line to the second phone line as a function of the abbreviated number, the routing number including IP addressing sufficient to support routing of the phone call through the packet-switched network to the second phone line such as if both phone lines were associated with the Centrex system.

10. The system of claim 9 wherein the control point is further configured for determining billing for the phone call as if the phone call was routed between the same network.

11. The system of claim 9 wherein the circuit-switched network is a TDM network.

12. The system of claim 9 wherein the control point is further configured for packetizing signals associated with the phone call from non-IP based signals to IP signals so as to support IP based phone calls.

13. The system of claim 9 wherein the circuit-switched network is a TDM network and the packet-switched network is a VoIP network.

14. The system of claim 9 wherein the control point is further configured for routing the phone call between the phones as a function of the routing number.

* * * * *